US006738346B1

(12) United States Patent
Prieto, Jr. et al.

(10) Patent No.: US 6,738,346 B1
(45) Date of Patent: May 18, 2004

(54) HIERARCHICAL DOWNLINK SCHEDULER FOR A PROCESSED SATELLITE PAYLOAD

(75) Inventors: Jaime L. Prieto, Jr., Torrance, CA (US); Jason R. Kincaid, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/270,356

(22) Filed: Mar. 16, 1999

(51) Int. Cl.[7] .................................................. H04J 15/00
(52) U.S. Cl. ........................ 370/229; 455/12.1; 455/427
(58) Field of Search ................................ 370/310, 351, 370/389, 412, 417, 427, 229, 323, 443, 444, 447; 342/352; 455/12.1, 13.2, 13.4, 17

(56) References Cited

U.S. PATENT DOCUMENTS

| | | | | |
|---|---|---|---|---|
| 4,491,947 A | * | 1/1985 | Frank ........................... | 370/323 |
| 5,736,959 A | * | 4/1998 | Patterson et al. ............ | 342/354 |
| 5,850,399 A | * | 12/1998 | Ganmukhi et al. .......... | 370/417 |
| 5,946,602 A | * | 8/1999 | Sayegh ......................... | 370/412 |
| 5,978,363 A | * | 11/1999 | Dimitrijevic et al. ........ | 370/319 |
| 6,138,261 A | * | 10/2000 | Wilcoxson et al. .......... | 370/307 |
| 6,233,451 B1 | * | 5/2001 | Noerpel et al. .............. | 455/427 |
| 6,292,659 B1 | * | 9/2001 | Olds et al. ................... | 455/12.1 |

FOREIGN PATENT DOCUMENTS

| | | |
|---|---|---|
| EP | 0820208 | 1/1998 |
| EP | 0889605 | 7/1999 |

OTHER PUBLICATIONS

Jon C. R. Bennett and Hui Zhang; Hierarchical Packet Fair Queueing Algorithms; Proc. of the AMC–SIGCOMM 96, Palo Alto CA., Aug. 1996, pp. 143–156.*

Jon C. R. Bennett and Hui Zhang; *Hierarchical Packet Fair Queueing Algorithms*; Proc. of the AMC–SIGCOMM 96, Palo Alto CA., Aug. 1996, pp. 143–156.
Anujan Varma and Dimitrios Stiliadis; *Hardware Implementation of Fair Queuing Algorithms for Asynchronous Transfer Mode Networks*, IEEE Communications Magazine, Dec. 1997, p. 54–68.
Toutain, F., *Decoupled Generalized Processor Sharing: A Fair Queueing Principle for Adaptive Multimedia Applications*, INFOCOM 1998, Seventeenth Annual Joint Conference of the IEEE Computer and Communications Societies, Proceedings IEEE, San Francisco, CA, USA, Mar. 29–Apr. 2, 1998, New York, NY, USA, pp. 291–298.
Bennett, Jon C. R., $WF^2 Q$: *Worst–Case Fair Weighted Fair Queueing*, Proceedings of IEEE INFOCOM 1996, Conference on Computer Communications, Fifteenth Annual Joint Conference of the IEEE Computer and Communications Societies, Networking the Next Generation, San Francisco, CA, USA, Mar. 24–28, 1996, vol. 1, Conf. 15, pp. 120–128.

(List continued on next page.)

Primary Examiner—Huy D. Vu
Assistant Examiner—Justin M Philpott
(74) Attorney, Agent, or Firm—John A. Miller; Warn, Burgess & Hoffmann, P.C.

(57) ABSTRACT

A downlink scheduler (20) is provided for scheduling the downlink transmission of data cells in a spot beam processing satellite (12). The downlink scheduler (20) includes a beam selector (48) for selecting one of the spot beams associated with the satellite (12), a plurality of wholesale selectors (50) for selecting one of a plurality of wholesalers, such that each of the wholesale selectors (50) is associated with one of the spot beams, and a plurality of retail selectors (52) for selecting one of a plurality of retail connections, such that each of the retail selectors (52) is associated with one of the wholesalers. Each of the selectors may use a packet fair queuing (PFQ) method to make its selection. The downlink scheduler (20) then passes at least one data cell from a selected retail connection to a downlink modulator (24), thereby scheduling the downlink transmission of data cells in the satellite.

19 Claims, 3 Drawing Sheets

OTHER PUBLICATIONS

Ohba, Yoshihiro, *QLWFQ: A Queue Length Based Weighted Fair Queueing Algorithm in ATM Networks*, INFOCOM 1997, Sixteenth Annual Joint Conference of the IEEE Computer and Communications Societies, Driving the Information Revolution, Proceedings IEEE, Kobe, Japan, Apr. 7–11, 1997, Los Alamitos, CA, USA, IEEE Comput. Soc., pp. 566–575.

Shrredhar, M. and George Varghese, *Efficient Fair Queuing Using Deficit Round–Robin*, IEEE, ACM Transactions on Networking, IEEE Inc., New York, USA, vol. 4, No. 3, Jun. 1, 1996, pp. 375–385.

Suri, Subhash, George Varghese and Girish Chandranmenon, *Leap Forward Virtual Clock: A New Fair Queuing Scheme with Guaranteed Delays and Throughput Fairness*, INFOCOM 1997, Sixteenth Annual Joint Conference of the IEEE Computer and Communications Societies, Driving the Information Revolution, Proceedings IEEE, Kobe, Japan, Apr. 7–11, 1997, Los Alamitos, CA, USA, IEEE Comput. Soc., pp. 557–565.

* cited by examiner

HIERARCHICAL DOWNLINK SCHEDULER FOR A PROCESSED SATELLITE PAYLOAD

BACKGROUND OF THE INVENTION

1. Field of the Invention

This invention relates generally to a packet-switched satellite communication system and, more particularly, to a hiearchical downlink scheduler for a spot-beam processing satellite.

2. Discussion of the Related Art

A packet-switched network differs from a circuit-switched network in that the latter requires a physical circuit between communicating users. Thus, the circuit is committed, even if no information is being transmitted, until communcation ends between the users. Generally, the packet-switched concept avoids this inefficient use of a communication link resource by breaking communication into data packets (i.e., data cells) with address information, and then transmitting all of the data packets, regardless of source or destination, over the critical circuit. Routing is performed on the data packets as information passes between users.

Asynchronous transfer mode (ATM) is one of a class of packet-switching technologies that routes data packet traffic via an address contained within the packet. ATM is a fast packet or cell relay concept that uses a short (e.g., 53 byte) fixed-length cell to transmit information across networks. ATM is defined in the overall broadband ISDN standard by ANSI and ITU-T standards committees. While ATM is being deployed for terrestrial network systems, it is still an evolving technology within satellite communication systems.

In the context of satellite communication systems, an ATM-based satellite link has a limited number of circuits (e.g., uplinks and downlinks), and yet still handles large volumes of data packet traffic. An efficient and fair technique of passing the packets from the router (or cell switch) to the downlink is required in a satellite link. In this case, "efficient" refers to minimizing the downlink bandwidth that is unused among the various users and service classes, whereas "fair" refers to an approximate equal allocation of bandwidth to equal paying users. A scheduler for passing cells from the cell switch to the downlink modulator is the critical point for increasing the efficiency of the satellite link. There are several unique characteristics of a satellite system, such as hopping beams and different coding rates, which make the scheduler different from existing terrestial networks.

Therefore, it is desirable to provide an innovative hierarchical scheme for scheduling data cell throughput from the cell switch to the downlink modulator in a satellite system. A downlink scheduler implementing such a scheme will thus provide more efficient and fair scheduling of downlink resources, while maintaining certain Quality of Service guarantees. In addition, the scheduler enables real-time purchasing and selling of wholesale bandwidth based on the availability of resources and the demand of various customers.

SUMMARY OF THE INVENTION

In accordance with the present invention, a downlink scheduler is provided for scheduling the downlink transmission of data cells in a spot beam processing satellite. The downlink scheduler includes a beam selector for selecting one of the spot beams associated with the satellite, a plurality of wholesale selectors for selecting one of a plurality of wholesalers, such that each of the wholesale selectors is associated with one of the spot beams, and a plurality of retail selectors for selecting one of a plurality of retail connections, such that each of the retail selectors is associated with one of the wholesalers. The downlink scheduler then passes at least one data cell from a selected retail connection to a downlink modulator, thereby scheduling the downlink transmission of data cells in the satellite.

BRIEF DESCRIPTION OF THE DRAWINGS

Other objects and advantages of the present invention will be apparent to those skilled in the art upon reading the following detailed description and upon reference to the drawings in which.

DETAILED DESCRIPTION OF THE PREFERRED EMBODIMENTS

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Figure 1:
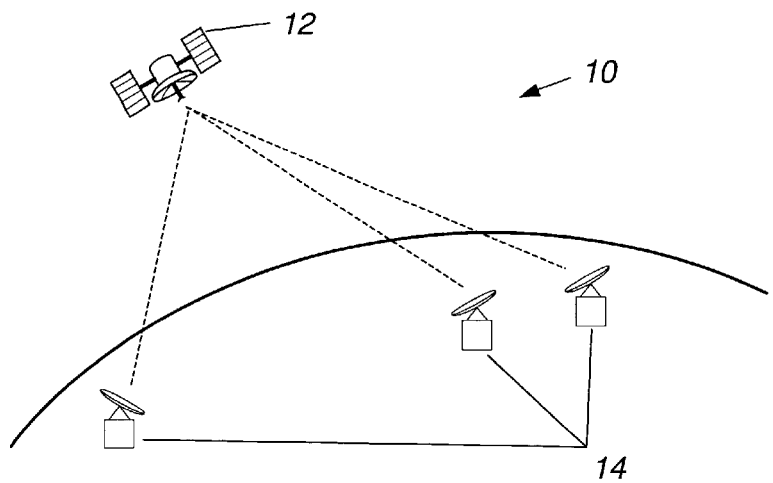
FIG. 1 is a diagram illustrating a typical satellite data communication system in accordance with the present invention.

A typical satellite communication system 10 is depicted in FIG. 1. The satellite communication system 10 includes at least one spot-beam (or hopping-beam) processing satellite 12 which may complete a virtual circuit connection between two of a plurality of ground stations 14. Spot beams provide for efficient satellite resource utilization by assigning each beam to a different geographic location. Within each beam, the satellite 12 can transmit data to a single ground station 14 via the addressing found in the data cells or broadcast data to a large number of ground stations 14. As will be apparent to one skilled in the art, beam types and quantities vary among different satellite systems.

Generally, information is uplinked from a transmitting ground station to the satellite 12 which in turn downlinks the information to a receiving ground station. For an uplink transmission, the satellite frequency domain is divided into narrow frequency channels such that each channel is used in a time-division multiple access (TDMA) mode, known to those skilled in the art. At the satellite 12, uplink transmission are demodulated and decoded to recover the self addressed, fixed length data cells. A cell switch onboard the satellite 12 allows the data cells to be independently routed to the different spot beams. To do so, the data cells are switched to queues before being downlinked to the appropriate ground station 14. As will also be apparent to one skilled in the art, a single access time division multiplexed (TDM) stream is typically used to downlink information to the receiving ground station.

Figure 2:
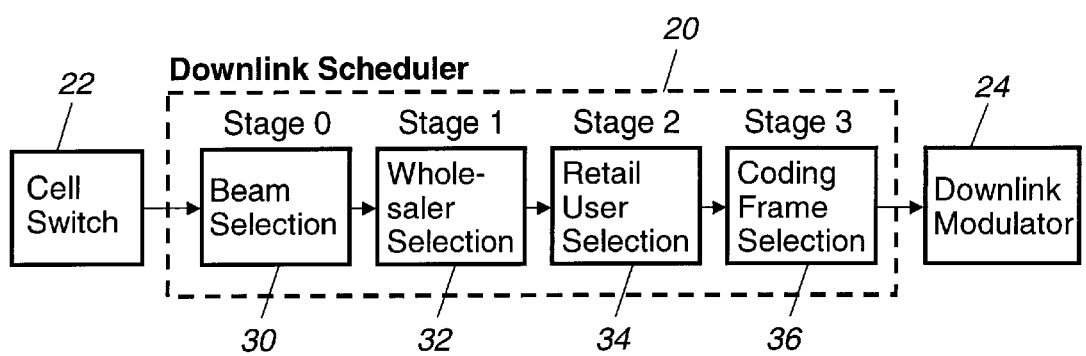
FIG. 2 is a block diagram showing a downlink scheduler in accordance with the present invention.

A downlink scheduler 20 is used to pass data cells from the queues of a cell switch 22 to a downlink modulator 24 as shown in FIG. 2. Thus, the downlink scheduler 20 selects which data cells awaiting downlink are processed next. Data cells are chosen by the scheduler 20 based on a service discipline as defined by its scheduling algorithm. As will be more fully explained, the selection process is based upon various parameters such as Quality-of-Service (QoS) guarantees, cell destination, wait-time and coding format.

Downlink schedulers may be classified as frame-based or sorted priority. Frame-based schedulers specify the maximum amount of traffic per session during the frame (e.g., a round-robin scheduler where sessions are served in a fixed order). In contrast, sorted priority schedulers sort the traffic based on a Global Variable. The design of many such sorted priority schedulers is based on Generalized Processor Sharing (GPS).

GPS is considered to be an ideal scheduling discipline because it guarantees each connection some portion of bandwidth at all times. The property of guaranteed bandwidth is called bandwidth isolation. GPS is defined with respect to a fluid model, where data cells are considered to be infinitely divisible. In operation, a GPS-type scheduler provides continuous bandwidth to each busy or backlogged connection. The term "backlogged" means that the connection has one or more data cells buffered in the switch throughout the time interval under consideration. In addition, excess bandwidth available from idle connections is divided proportionally between the backlogged connections. In other words, GPS serves each connection at every instant with a minimum rate equal to its reserved rate.

Actual data cell traffic is non-fluid and therefore must be serviced as sequential data cells. Each data cell is assigned service deadlines at arrival time. These service deadlines are referred to as "virtual timestamps" and form the basis for GPS-type scheduling. Data cells are ordered by deadline immediacy based on their timestamp and then transmitted in that order. However, a downlink scheduler must provide the same service to all of the backlogged connections at the same time. To track the service they provide, GPS-type schedulers use the concept of potential. The potential of a connection is a non-decreasing function of time during a system busy period. Accordingly, a backlogged connection's potential increases by the amount of service it receives. The objective of a "fair" GPS-type scheduler is to equalize the potential of each backlogged connection within a small interval of time. In this way, these GPS-type schedulers are said to use Packet Fair Queuing (PFQ). Examples of PFQ-based scheduling algorithms which may be used in accordance with the present invention has been published in Anujan Varma and Dimitrios Stiliadis, "Hardware Implementation of Fair Queuing Algorithms for Asynchronous Transfer Mode Networks", IEEE Communications Magazine, December 1997, pp. 54–68.

Returning to FIG. 2, the downlink scheduler 20 of the present invention implements a hierarchical scheduling scheme for scheduling cell throughput from the cell switch 22 to the downlink modulator 24. A basic hierarchical scheduling technique for use in terrestrial communication networks has been published in Jon C. R. Bennett and Hui Zhang, "Hierarchical Packet Fair Queuing Algorithms", Proc. of the AMC-SIGCOMM 96, Palo Alto Calif., August 1996, pp. 143–156. In contrast, the hierarchical scheduling scheme of the present invention includes a beam selection stage 30, a wholesaler selection stage 32, one or more retail user selection stages 34 and a coding frame selection stage 36.

In operation, the hierarchical scheduling scheme first selects the appropriate hopping beam. Next, it selects the wholesaler and retail user before selecting the coding format for the downlink frame. In this way, the hierarchical framework reduces the number of calculations performed for subsequent stages. In each of the stages, the selection is dynamically reconfigurable in real-time, as opposed to the usual method of fixed tables of priority selection. With respect to efficiency, fairness, and QoS guarantees, this type of hierarchical scheduling scheme allows for the optimum scheduling of cells to the downlink modulator 24.

Each stage employs a PFQ-based scheduling algorithm to make its selection. Although Worst-case Fairness Weighted Fair Queing (WF$^2$Q+) or Starting Potential-Based Fair Queuing (SPFQ) are the presently preferred scheduling algorithms, this is not intended as a limitation of the invention. On the contrary, Weighted Fair Queueing (WFQ), Deficit Round-Robin, Self-Clocked Fair Queuing (SCFQ), VirtualClock, Shaped VirtualClock, and Shaped SPFQ may also be suitable scheduling algorithms for use in the downlink scheduler 20. Although it is preferable that each stage implements the same PFQ-based algorithm, it is envisioned that different algorithms could be used in different stages.

Some of these scheduling algorithms (e.g., WFQ) mimic GPS by ordering discrete cells according to the time they would finish in an equivalent GPS fluid model. To do so, these scheduling algorithms precisely track the state of the GPS fluid-model. It should be noted that the GPS fluid-model is highly complex and thus difficult to implement in hardware. Although the downlink scheduler 20 typically must be implemented in hardware due to the high switch rates associated with the ATM-based cell switch 22, it is envisioned that the scheduler may still employ these types of scheduling algorithms.

Figure 3:
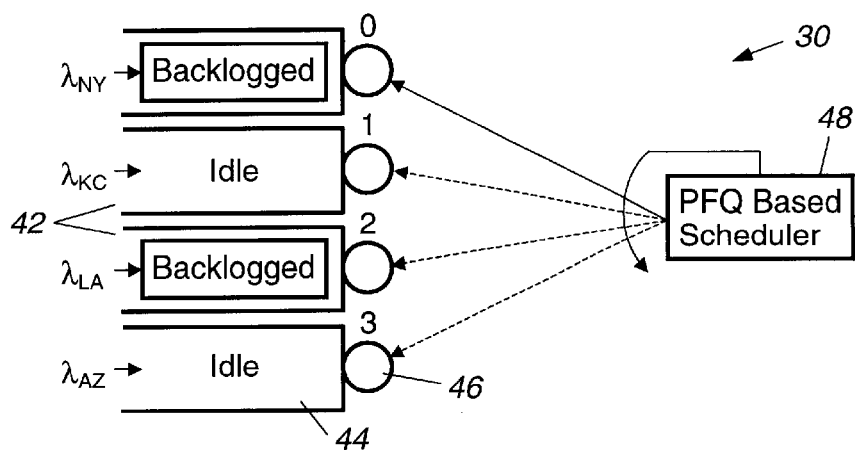
FIG. 3 is a block diagram showing a beam selection stage of the downlink scheduler of the present invention.

First, the beam selection stage 30 applies a PFQ-based algorithm to select which beam (i.e., channel) needing cell throughput is selected for processing. In FIG. 3, several queues 42 are to be examined to determine which is selected for downlink. In the example shown, each queue corresponds to a different beam, and thus a different geographic area to be illuminated. Each queue 42 includes a buffer 44 and a service discipline 46. Some of the queues 42 may be idle, while other queues 42 are backlogged. A selector 48 uses a PFQ-based scheduling algorithm to choose which beam is to be connected to the downlink. The selected beam is assigned a time of access to the downlink (in integer multiples of the downlink frame time) based on the demand and assigned equivalent bandwidth, and then passed to the next stage. By dynamically scheduling the beam hop based on actual user demand, subscription rates, and QoS constraints, the beam selection stage 30 makes efficient use of bandwidth not possible with the conventional fixed tables approach.

Figure 4:
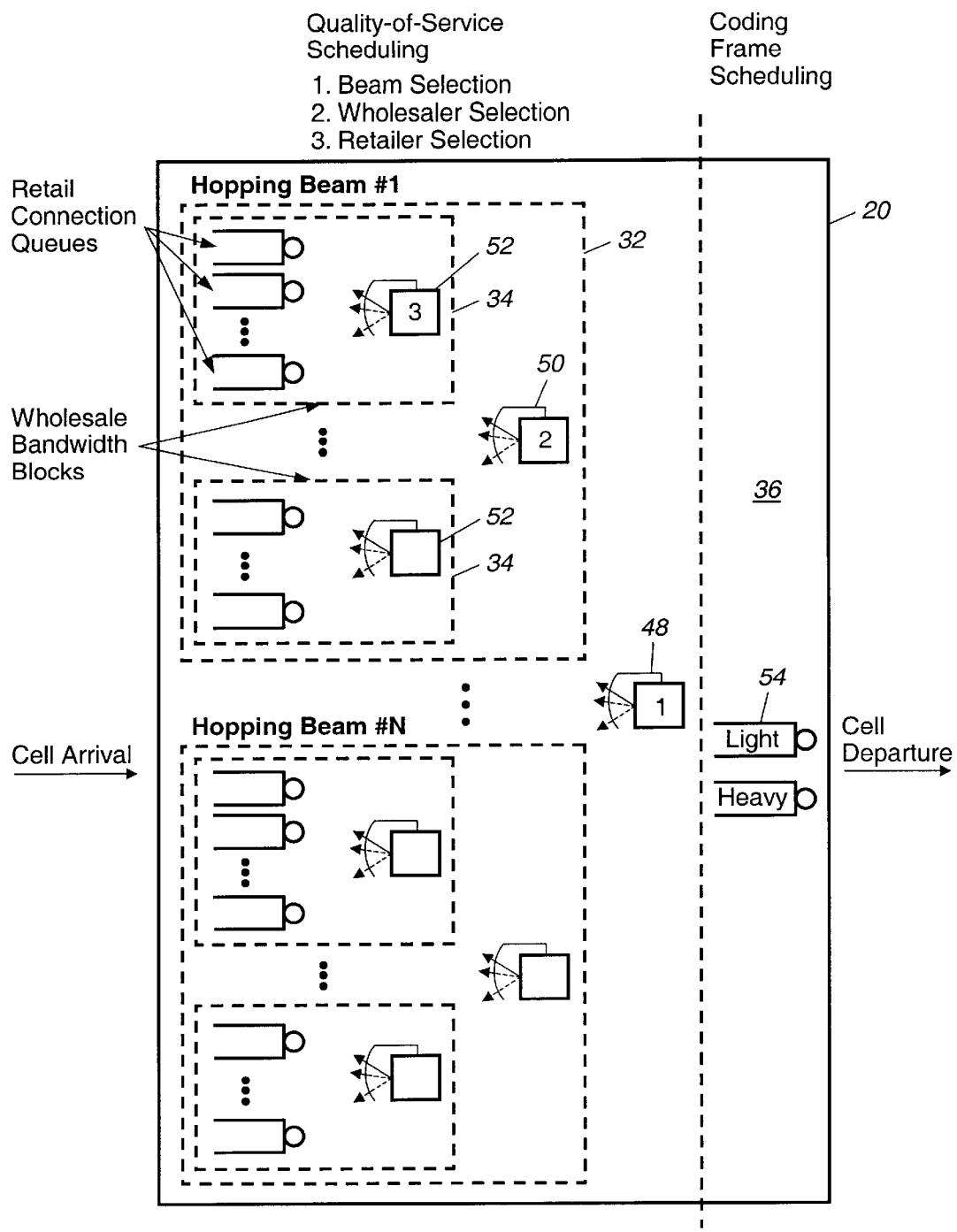
FIG. 4 is a block diagram showing a preferred embodiment of the hierarchical downlink scheduler of the present invention.

FIG. 4 illustrates how each of the stages are related to one another in a preferred embodiment of the scheduler 20. After the beam selector 48 choses a beam, the wholesale purchaser of the resource is selected in the wholesaler selection stage 32. Again, the selection is made by a selector component 50 which employs a PFQ-based scheduling algorithm. Closely coupled to the wholesaler selection stage 32 is the retailer selection stage 34. In this stage, the retailer of the resource is selected by a retailer selector component 52. Although FIG. 4 only shows a single retailer stage, it is envisioned that more than one retailer selection stage may be needed to support a hierarchical structure of retailer users.

In addition, the retailer selection stage 34 may include a service selection level, such as Guaranteed or Best Effort service levels. Guaranteed service is provided when the network guarantees a QoS level to each connection (e.g., ATM CBR, rt-VBR, or nrt-VBR); whereas Best Effort service is provided when the network guarantees nothing except to provide the "best" service possible (e.g., ABR or UBR).

Finally, the optimum downlink coding rate is selected in the coding frame selection stage 36. In this embodiment, the coding frame selection stage 36 is independent from the other stages, and thus the selection of either a heavy or light coding rate is made after the other stages. At least two coding rate queues 54 are used to store data cells received from the other selection stages of the scheduler 20. A coding rate selector selects data cells from one of the queues 54 which are in turn passed to the downlink modulator. By dynamically scheduling the coding-frame selection, this stage also makes efficient use of bandwidth not possible with conventional fixed schedulers. As will be apparent to one skilled in the art, the coding frame selection is based on throughput and integrity requirements for the selected data. Although the preceding discussion has only made reference to either light or heavy coding, it is envisioned that the present invention can select from many distinct coding rates.

Figure 5:
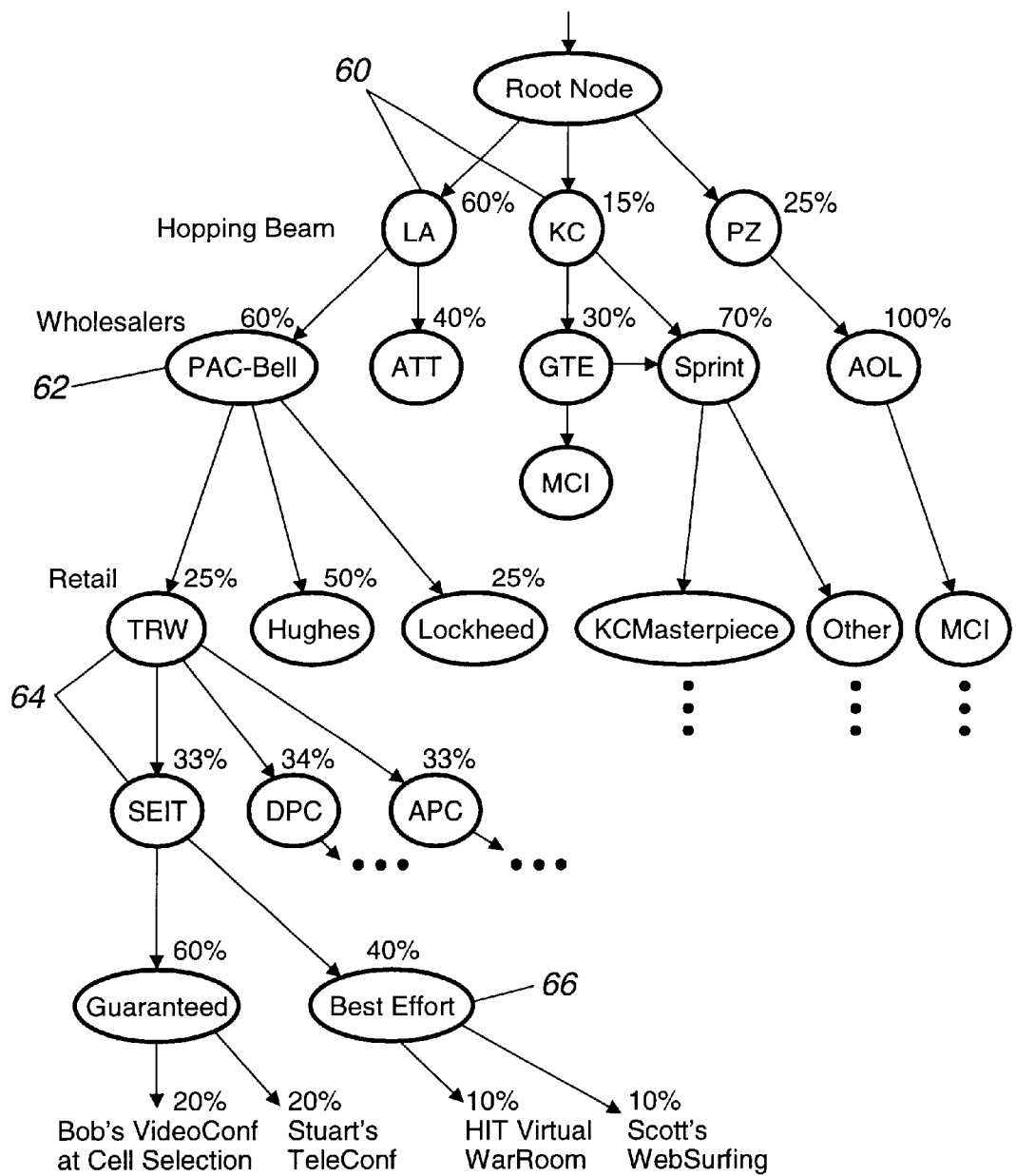
FIG. 5 is an alternative representation of the hierarchical scheduling scheme of the present invention.

An alternative view of the hierarchical scheduling scheme is provided in FIG. 5. In this example, the link bandwidth is first divided among three spot beams 60. The beam selection stage assigns individual beams access to the downlink as a percentage of access time. At the next level, each wholesale 62 within a beam is further allocated a percentage of that beam's individual allotment. A similar allocation is made for each retailer 64 in each subsequent retailer level. In this case, there are three retailer levels, including a service selection level 66. Finally, each of the (retail) connections 68 are allocated a percentage of the resource. Thus, an exemplary division of the satellite resource is represented in FIG. 5.

Under this type of hierarchical scheduling scheme, if a first retailer (e.g., TRW) is not utilizing all of its bandwidth, then the other retailers under this wholesaler (i.e., Hughes and Lockheed) have first priority to receive this excess bandwidth. Only if the parent wholesaler (i.e., Pac-Bell), cannot use up all of its excess bandwidth, is the remaining bandwidth distributed to another wholersalers (i.e., ATT) within the beam. In this way, bandwidth allocation is influenced by actual user demand.

In each of stages, the allocation of bandwidth is dynamically reconfigurable in real-time (e.g., every hour). For instance, the spot beam associated with Kansas City may be allocated 60% of the bandwidth in the early part of the day (Eastern Standard Time). As the day transpires, user demand for the satellite resources increases for the spot beams servicing other western geographic locations. Accordingly, Kansas City's allocation of bandwidth may decrease to 15%, whereas the allocation of bandwidth for Los Angeles and Phoenix increases to 60% and 25%, respectively. In any event, the downlink scheduler 20 of the present invention, makes efficient use of the satellite's bandwidth by reconfiguring the allocation within each stage throughout the day.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. A spot beam processing satellite having a plurality of spot beams for use in a satellite communication system, comprising:

a plurality of downlink queues including downlink data cells, each of said queues corresponding to a downlink connection;

a downlink modulator for transmitting the downlink data cells from the satellite; and a downlink scheduler for passing the downlink data cells from said plurality of downlink queues to said downlink modulator, said downlink scheduler includes a beam selector for selecting one of the plurality of spot beams to use when downlinking the downlink data cells, said beam selector using a packet fair queueing (PFQ) method to select the spot beam, said downlink scheduler further including a plurality of wholesale selectors for selecting the downlink data cells that are associated with one of a plurality of wholesalers, each one of said wholesale selectors being associated with one of said plurality of spot beams, and including a plurality of retail selectors for selecting the downlink data cells that are associated with one of a plurality of retail connections, each one of said retail selectors being associated with one of said plurality of wholesalers.

2. The spot beam processing satellite of claim 1 wherein each one of said plurality of spot beams being allocated a predefined portion of satellite bandwidth, whereby said beam selector selects a spot beam based on the predefined portion of the satellite bandwidth.

3. The spot beam processing satellite of claim 1 wherein the PFQ method is selected from the group consisting of Worst-case Fairness Weighted Fair Queuing ($WF^2Q+$), Starting Potential-Based Fair Queuing (SPFQ), Weighted Fair Queueing (WFQ), Deficit Round-Robin, Self-Clock Fair Queuing (SCFQ), VirtualClock, Shaped VirtualClock, and Shaped SPFQ.

4. The spot beam processing satellite of claim 1 further comprising a retail connection queue associated with each of said plurality of retail connections, whereby each of said retail connection queues stores the downlink data cells and the downlink scheduler passes at least one of the downlink data cells from a selected retail connection queue to the downlink modulator.

5. The spot beam processing satellite of claim 1 further comprises:

at least two coding rate queues for storing the downlink data cells received from said selected retail connection queue; and a coding rate selector for selecting the downlink data cells to downlink from at least one of said coding rate queues, whereby the downlink scheduler passes at least one of the downlink data cells from a selected coding rate queue to said downlink modulator.

6. A downlink scheduler for scheduling the downlink transmission of data cells in a spot beam processing satellite, comprising:

a beam selector for selecting one of a plurality of spot beams for use in downlinking the data cells, said plurality of spot beams being associated with the satellite;

a plurality of wholesale selectors for selecting the data cells that are associated with one of a plurality of wholesalers, each one of said wholesale selectors being associated with one of said plurality of spot beams;

a plurality of retail selectors for selecting the data cells that are associated with one of a plurality of retail connections, each one of said retail selectors being associated with one of said plurality of wholesalers;

and a retail connection queue associated with each of said plurality of retail connections, whereby each of said retail connection queues stores the data cells associated with the corresponding retail connection and the downlink scheduler passes the data cells from a selected retail connection queue to a downlink modulator.

7. The downlink scheduler of claim 6 further comprising:

at least two coding rate queues for storing the data cells received from said selected retail connection queue; and a coding frame selector for selecting the data cells from at least one of said coding rate queues, whereby the downlink scheduler passes at least one of the data cells from a selected coding rate queue to the downlink modulator.

8. The downlink scheduler of claim 6 wherein at least one of said beam selector, said plurality of wholesale selectors and said plurality of retail selectors uses a packet fair queueing (PFQ) method to select data cells.

9. The downlink scheduler of claim 8 wherein each one of said plurality of spot beams being allocated a predefined portion of the satellite bandwidth, whereby said beam selector selects a spot beam based on the predefined portions of the satellite bandwidth.

10. The downlink scheduler of claim 8 wherein the PFQ method is selected from the group consisting of Worst-case Fairness Weighted Fair Queuing (WF$^2$Q+), Starting Potential-Based Fair Queuing (SPFQ), Weighted Fair Queueing (WFQ), Deficit Round-Robin, Self-Clocked Fair Queuing (SCFQ), VirtualClock, Shaped VirtualClock, and Shaped SPFQ.

11. The downlink scheduler of claim 8 wherein each one of said plurality of wholesalers being allocated a predefined portion of the satellite bandwidth within the bandwidth allocated to the corresponding spot beam, whereby the wholesale selector selects a wholesaler based on said predefined portions of the satellite bandwidth.

12. The downlink scheduler of claim 11 wherein each one of said plurality of retail connections being allocated a predefined portion of the satellite bandwidth within the satellite bandwidth allocated for the corresponding wholesaler, whereby the retail selector selects a retail connection based on the predefined portions of the satellite bandwidth.

13. A method for scheduling the downlink transmission of data cells in a spot beam processing satellite, comprising the steps of:

selecting a spot beam from a plurality of spot beams for use in downlinking the data cells, said plurality of spot beams being associated with the satellite;

selecting one of a plurality of wholesalers from which to downlink the data cells, said plurality of wholesalers being associated with the selected spot beam;

selecting one of a plurality of retail connections from which to downlink the data cells, said plurality of retail connections being associated with the selected wholesaler and each of said retail connections having a retail connection queue for storing the data cells; and passing at least one of the data calls from the retail connection queue of a selected retail connection to a downlink modulator, thereby scheduling the downlink transmission of the data cells in the satellite.

14. The method of claim 13 wherein at least one of the steps of selecting a spot beam, the step of selecting one of a plurality of wholesalers, and the step of selecting one of the plurality of retail connections further comprises using a packet fair queuing (PFQ) method to make the selection.

15. The method of claim 14 wherein the PFQ method is selected from the group consisting of Worst-case Fairness Weighted Fair Queuing (WF2Q+), Starting Potential-Based Fair Queuing (SPFQ), Weighted Fair Queueing (WFQ), Deficit Round-Robin, Self-Clocked Fair Queuing (SCFQ), VirtualClock, Shaped VirtualClock, and Shaped SPFQ.

16. The method of claim 13 wherein the step of selecting a spot beam further comprises allocating a predefined portion of the satellite bandwidth to each of said plurality of spot beams and selecting a spot beam based on said predefined portions of the satellite bandwidth.

17. The method of claim 16 wherein the step of selecting one of a plurality of wholesalers further comprises allocating a predefined portion of the satellite bandwidth within the bandwidth allocated to the corresponding spot beam to each one of said plurality of wholesalers and selecting a wholesaler based on said predefined portions of satellite bandwidth.

18. The method of claim 17 wherein the step of selecting one of a plurality of retail connections further comprises allocating a predefined portion of the satellite bandwidth within the bandwidth allocated to the corresponding wholesaler to each one of said plurality of retail connections and selecting a retail connection based on said predefined portions of satellite bandwidth.

19. The method of claim 17 wherein the step of selecting one of a plurality of wholesalers further comprises reallocating the bandwidth allocated to the corresponding spot beam amongst said plurality of wholesalers.

* * * * *